(12) United States Patent
Khalil et al.

(10) Patent No.: US 9,615,246 B2
(45) Date of Patent: *Apr. 4, 2017

(54) DYNAMIC ALLOCATION OF HOST IP ADDRESSES

(71) Applicant: Apple Inc., Cupertino, CA (US)

(72) Inventors: Mohamed Khalil, Murphy, TX (US); Haseeb Akhtar, Garland, TX (US)

(73) Assignee: Apple Inc., Cupertino, CA (US)

( * ) Notice: Subject to any disclaimer, the term of this patent is extended or adjusted under 35 U.S.C. 154(b) by 780 days.

This patent is subject to a terminal disclaimer.

(21) Appl. No.: 13/661,100

(22) Filed: Oct. 26, 2012

(65) Prior Publication Data

US 2013/0044719 A1 Feb. 21, 2013

Related U.S. Application Data

(63) Continuation of application No. 11/065,899, filed on Feb. 25, 2005, now Pat. No. 8,311,552.

(60) Provisional application No. 60/548,496, filed on Feb. 27, 2004, provisional application No. 60/569,790, filed on May 10, 2004.

(51) Int. Cl.
*H04W 72/00* (2009.01)
*H04W 8/26* (2009.01)
*H04L 29/12* (2006.01)
*H04W 80/04* (2009.01)

(52) U.S. Cl.
CPC ............ *H04W 8/26* (2013.01); *H04L 61/2076* (2013.01); *H04L 61/1511* (2013.01); *H04W 80/04* (2013.01)

(58) Field of Classification Search
CPC ........ H04W 8/02–8/16; H04W 60/005; H04M 7/126–7/128; H04M 9/00
See application file for complete search history.

(56) References Cited

U.S. PATENT DOCUMENTS

| | | | |
|---|---|---|---|
| 7,061,887 B2 | 6/2006 | Fan | |
| 2004/0047348 A1* | 3/2004 | O'Neill | .................. 370/389 |
| 2004/0246939 A1 | 12/2004 | Koskiahde et al. | |
| 2005/0079869 A1 | 4/2005 | Khalil et al. | |
| 2006/0209760 A1 | 9/2006 | Saito et al. | |

* cited by examiner

*Primary Examiner* — Keith Fang
(74) *Attorney, Agent, or Firm* — Meyertons, Hood, Kivlin, Kowert & Goetzel, P.C.

(57) ABSTRACT

The present invention facilitates dynamic allocation of home IP addresses for a mobile node, when it is roaming away from a home network and supported by a foreign network. After the mobile node obtains a care-of address from the foreign network, a stateful or stateless configuration process is used to dynamically allocate a home IP address for the mobile node. In the stateful approach, a binding update message is used to request a home IP address for the mobile node from its home agent. In a stateless embodiment, the mobile node will create a home IP address, which is sent to the home agent for verification via the binding update message. The home agent will receive the home IP address in the binding update message, verify the home IP address, and send acknowledgement of the verification, assuming the home IP address is verified, to the mobile node.

20 Claims, 4 Drawing Sheets

DYNAMIC ALLOCATION OF HOST IP ADDRESSES

PRIORITY CLAIM

This application is a continuation application of U.S. patent application Ser. No. 11/065,899, titled "Dynamic Allocation of Host IP Addresses", filed on Feb. 25, 2005, which claims the benefit of U.S. provisional application Ser. No. 60/548,496 filed Feb. 27, 2004 and U.S. provisional application Ser. No. 60/569,790 filed May 10, 2004, all of which are hereby incorporated by reference in their entireties, as if fully and completely set forth herein.

FIELD OF THE INVENTION

The present invention relates in general to mobile communications, and in particular to dynamically allocating home IP addresses in a mobile communication environment.

BACKGROUND OF THE INVENTION

The rapid acceptance and expansion of the Internet and mobile communications has led to consumers demanding greater functionality from their mobile nodes, such as personal computers, personal digital assistants, telephones, and the like. In particular, consumers want the ability to move from one network access point to another on the same or different networks without disrupting communication connectivity.

Newer Internet Protocols (IPs), such as IPv6, support such functionality by allowing a mobile node to move from one wireless access point or base station to another without disrupting communications. However, each mobile node must be provided with a home IP address. Currently, service providers must manually configure static home IP addresses for the mobile nodes of their millions of subscribers. This provisioning process is very cumbersome, time consuming, and expensive. Accordingly, there is a need for the ability to dynamically allocate and use home IP addresses for mobile nodes in an efficient and cost-effective manner, including when the mobile node is roaming in a foreign network.

SUMMARY OF THE INVENTION

The present invention facilitates dynamic allocation of home IP addresses for a mobile node, when the mobile node is roaming away from a home network and being supported by a foreign network. After the mobile node obtains a care-of address from the foreign network, a stateful or stateless configuration process is used to dynamically allocate a home IP address for the mobile node. In the stateful approach, a binding update message is used to request a home IP address for the mobile node from a home agent for the mobile node. The binding update message will also include an identifier for the mobile node, and perhaps the care-of address. Upon receiving the binding update message, the home agent will allocate a home IP address for the mobile node and send the home IP address to the mobile node, perhaps in a binding acknowledgement message sent in response to the binding update message. In a stateless embodiment, the mobile node will create a home IP address, and then send the home IP address to the home agent for verification via the binding update message. The home agent will receive the home IP address in the binding update message, verify the home IP address for the mobile node, and send acknowledgement of the verification, assuming the home IP address is verified, to the mobile node. Again, the acknowledgement may be provided in a binding acknowledgement message, which is sent to the mobile node by the home agent.

In either embodiment, the home agent may update domain name servers, which are accessible via the home network for the mobile node or foreign networks, to allow correspondent nodes to obtain the home IP address for the mobile node. The home agent may allow other correspondent nodes to communicate with the mobile node directly or indirectly using the home IP address. The care-of address for the mobile node may be sent with the binding update messages, wherein the home agent will associate the care-of address with the home IP address of the mobile node, and perhaps the identifier indicia for the mobile node. The care-of addresses may be obtained in a stateful or stateless configuration. As such, the stateful approach would allow the mobile node to obtain the care-of address from the foreign network. The mobile node may create the home IP address based on an identifier for the mobile node and prefix information for the home network. A stateless approach would entail the mobile node creating the care-of address based on an identifier for the mobile node and a prefix for and obtained from the foreign network.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
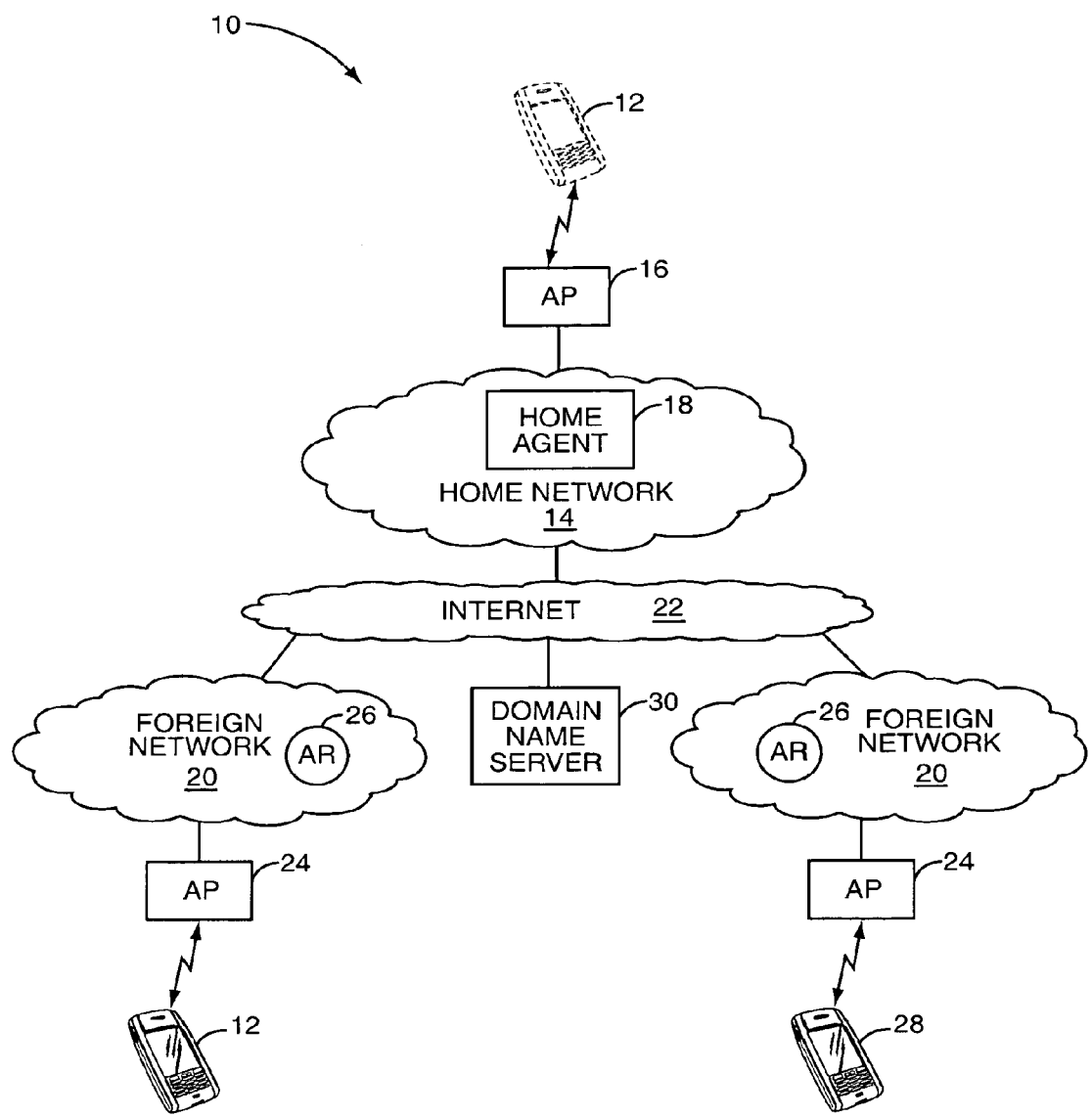
FIG. 1 is a block representation of a communication environment according to one embodiment of the present invention.

With reference to FIG. 1, a block representation of a communication environment 10 is illustrated according to one embodiment of the present invention. The communication environment 10 allows a mobile node 12, such as a personal computer, personal digital assistant, telephone, or the like, to facilitate wireless communications via the mobile node's home network 14 or other networks via an appropriate access point 16. Generally, the home network 14 will include a home agent 18 to facilitate communications via the home network 14, and in particular other networks, which are generally referred to as foreign networks 20. The home agent 18 may take different forms, including that of a traditional home agent and authentication, authorization, and accounting (AAA) server. The home network 14 may be connected to the foreign networks 20 directly or via an intermediate network, such as the Internet 22.

In operation, the mobile node 12 may facilitate communications through the home network 14 via the access point 16, or through the foreign networks 20 via access points 24. When roaming in a foreign network 20, the mobile node 12 will interact with the home agent 18 as will be described below, to support such roaming and allow other entities to reach the mobile node 12 directly or indirectly through the home agent 18. When using Internet Protocol version 6 (IPv6), a mobile node 12 can move from one access point 16, 24 to another without losing network connectivity. When moving from one network to another or from one access point 16, 24 to another, the mobile node 12 must register with the home agent 18 and be provided with a home IP address to facilitate communications. At present, the home IP address must be statically provisioned, and the various network elements in the home network 14 as well as in the foreign networks 20 must be provisioned such that the statically configured home IP address for the mobile node 12 is globally known and trackable via the home agent 18. Unfortunately, this process of statically configuring the home IP addresses for each mobile node 12 is manually intensive and expensive. The present invention allows for the home IP address to by dynamically allocated as necessary when the mobile node 12 moves from one network to another.

When the mobile node 12 roams away from the home network 14 and connects to a foreign network 20 via an access point 24, the foreign network 20 will provide a care-of address for the foreign network 20. The care-of address may be a Global Unicast Address with a network prefix corresponding to the foreign network 20. The mobile node 12 can obtain this address using stateless auto-configuration, or by using a stateful configuration method such as Dynamic Host Control Protocol. The stateless auto-configuration allows the mobile node 12 to generate its own addresses by using a combination of local information already available to the mobile node 12, as well as non-local information that may be provided by an access router (AR) 26 on the foreign network 20. For example, the access routers 26 may advertise the prefixes that identify the subnet or subnets that are associated with the foreign network 20. The mobile node 12 may generate an interface identifier that uniquely identifies an interface on the subnet. An address, such as the care-of address, is formed by combining the prefix and the interface identifier.

For stateful configuration, the mobile node 12 would obtain pertinent addresses, such as the care-of address, from a server (not shown) on the foreign network 20. In addition to addresses, other information may be obtained using stateless auto-configuration or stateful configuration methods.

In the communication environment 10 of FIG. 1, a node that can communicate or correspond with the mobile node 12 is referred to as a correspondent node 28, which may take the same forms as the mobile node 12. In a basic operation, the correspondent node 28 sends packets to the mobile node 12 using the mobile node's home IP address. The home agent 18 will intercept these packets and tunnel them to the mobile node's current care-of address on the foreign network 20. Similarly, the mobile node 12 may send packets to the correspondent node 28 through the home agent 18.

In a more efficient embodiment, route optimization may be used, wherein the correspondent node 28 may ultimately send packets directly to the mobile node's care-of address, and the mobile node 12 may send packets directly to the correspondent node 28 using an appropriate address, without having the home agent 18 relay packets between the mobile node 12 and the correspondent node 28. Notably, the correspondent node 28 may need to interact with the home agent 18 directly or indirectly during initial communications to obtain the care-of address for the mobile node 12. Alternatively, once an initial packet has been sent to the mobile node 12 through the home agent 18, the mobile node 12 may send the care-of address to the correspondent node 28. Such operation is set forth in the standards for IPv6, and should be well known to those skilled in the art.

Once the care-of address is obtained for the mobile node 12, the mobile node 12 will send a binding update message to the home agent 18. The binding update message effectively registers the mobile node's care-of address in association with the mobile node 12 with the home agent 18. For the present invention, the binding update message is used to assist in dynamically allocating the home IP address for the mobile node 12.

In a first embodiment, a stateful configuration method is used, wherein the binding update message is modified to include a request for the home agent 18 to allocate a home IP address for the mobile node 12. The binding update message will include the care-of address currently assigned to the mobile node 12, as well as identifier indicia for the mobile node 12. The identifier indicia may be any type of mobile node identifier, including a network address identifier, mobile node name, or mobile node identification number. The home agent 18 will be able to identify the mobile node 12 based on the identifier indicia, allocate a home IP address for the mobile node 12, and associate the care-of address and the home IP address with the mobile node 12. In response to the binding update message, the home agent 18 will send a binding acknowledgement message back to the mobile node 12, wherein the binding acknowledgement message will include the home IP address allocated for the mobile node 12.

In an alternative embodiment, a stateless auto-configuration approach is taken for allocating a home IP address for the mobile node 12. In particular, the mobile node 12 will have access to home network information such as a home network prefix and the mobile node's identifier indicia, and will create a home IP address based on the home network prefix and identifier indicia. The home IP address created at the mobile node 12 is then sent to the home agent 18 in a binding update message, which will include a request to verify the home IP address for the mobile node 12 having the provided identifier indicia. The home agent 18 will then verify the home IP address as being valid and usable by the mobile node 12 and will respond with appropriate verification or denial in the binding acknowledgement message. Thus, the present invention uses the binding update messages to support dynamic allocation of home IP addresses for the mobile node 12. Once the home agent 18 has allocated a home IP address or verified a home IP address for the mobile node 12, it may update domain name servers 30 or other entities in the home network 14, foreign networks 20, or the Internet 22, to allow other entities such as correspondent nodes 28 to obtain the home IP address, which is dynamically associated with the mobile node 12, to facilitate communications.

Figure 2:
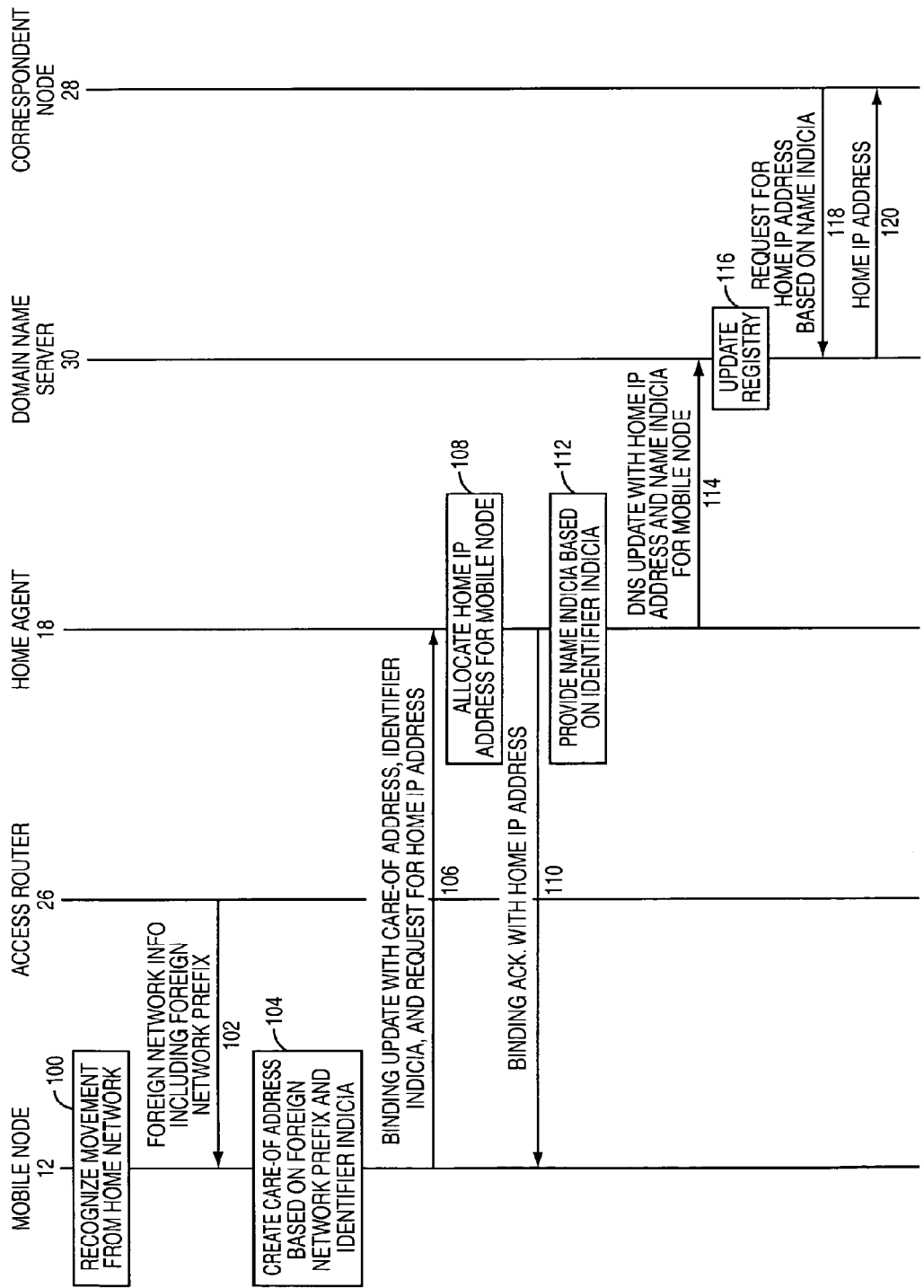
FIG. 2 is a communication flow diagram according to one embodiment of the present invention.
Figure 3:
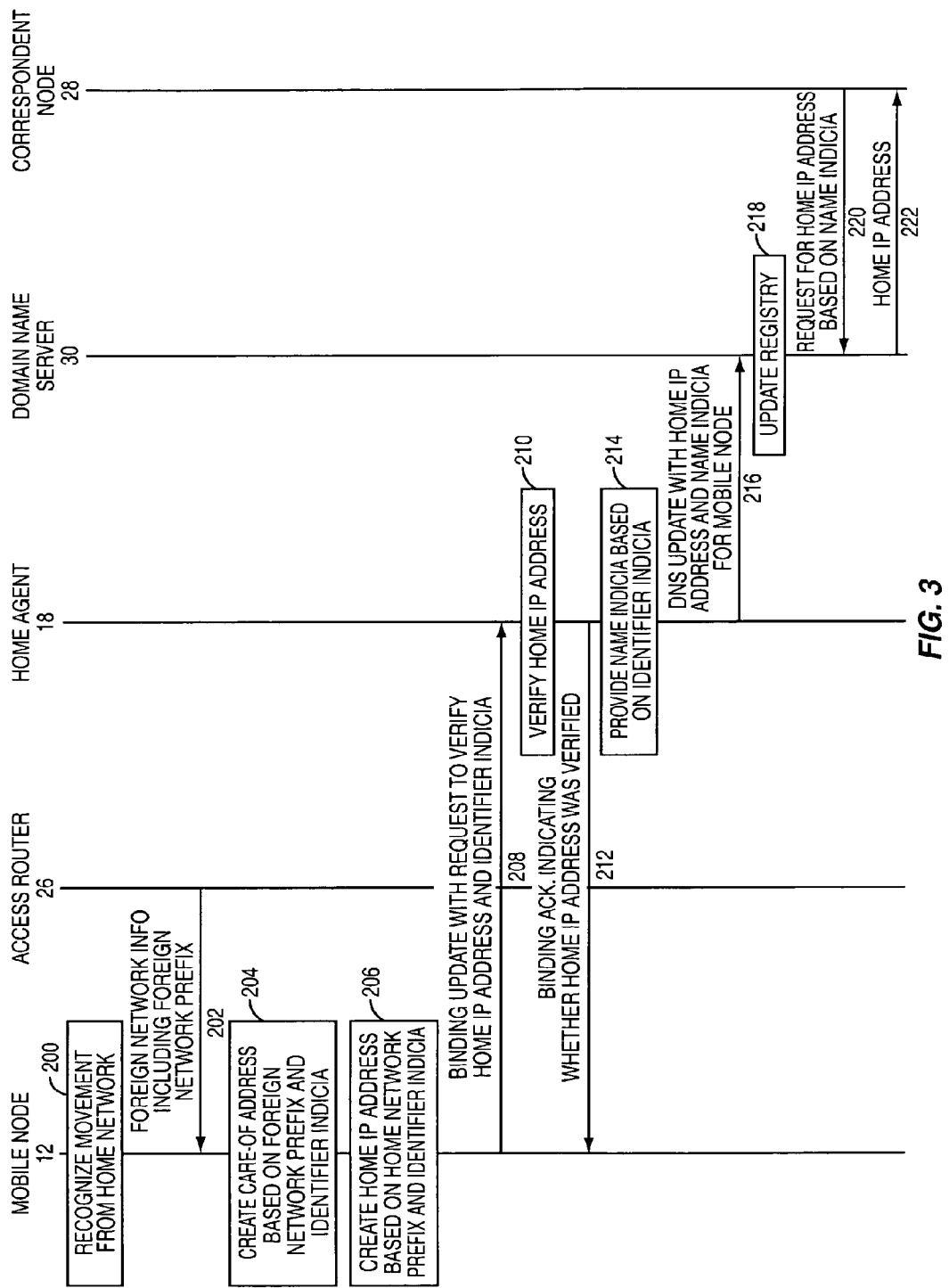
FIG. 3 is a communication flow diagram according to a second embodiment of the present invention.

FIGS. 2 and 3 illustrate communication flow diagrams for the stateful and stateless techniques for dynamically allocating home IP addresses for the mobile node 12 when roaming to a foreign network 20. In both scenarios, the care-of address is obtained from the access router 26 using a stateless configuration technique. With particular reference to FIG. 2, a stateful embodiment for dynamically allocating a home IP address is illustrated. Assume that the mobile node 12 initially recognizes that it has moved from the home network 14 to a foreign network 20 (step 100). As such, the mobile node 12 may listen for foreign network information, which may include the foreign network prefix to be used for creating a care-of address for the mobile node 12 (step 102). Upon receiving the foreign network information, the mobile node 12 will create a care-of address based on the foreign network prefix and identifier indicia associated with the mobile node 12 (step 104). Once the care-of address is created, the mobile node 12 will send a binding update message to the home agent 18 (step 106). In this embodiment, the request for a home IP address is provided in the first binding update message that the mobile node 12 sends to the home agent 18 upon engaging the foreign network 20. The binding update message will include the care-of address and identifier indicia for the mobile node 12, as well as a request for a home IP address (step 106). The home agent 18 will then allocate a home IP address for the mobile node 12 (step 108) and send the home IP address to the mobile node 12 in a binding acknowledgement message (step 110).

Based on the identifier indicia, the home agent 18 will provide name indicia for the mobile node 12 for the domain name server 30 (step 112) and then send a Domain Name Server (DNS) update to the domain name server 30 (step 114). The DNS update will include the home IP address and name indicia for the mobile node 12. The domain name server 30 will then update its registry (step 116). At this point, the correspondent node 28 can access the domain name server 30 using the appropriate name indicia for the mobile node 12 to obtain the most current home IP address for the mobile node 12 (steps 118 and 120).

Turning now to FIG. 3, the stateless configuration technique of the present invention for dynamically allocating a home IP address for the mobile node 12 is illustrated. Assume that the mobile node 12 initially recognizes that it has moved from the home network 14 to a foreign network 20 (step 200). As such, the mobile node 12 may listen for foreign network information, which may include the foreign network prefix to be used for creating a care-of address for the mobile node 12 (step 202). Upon receiving the foreign network information, the mobile node 12 will create a care-of address based on the foreign network prefix and identifier indicia associated with the mobile node 12 (step 204).

At this point, stateless configuration of the home IP address is implemented, wherein the mobile node 12 will create the home IP address based on home network information, such as the home network prefix and the mobile node's identifier indicia (step 206). Once the home IP address is created, the mobile node 12 will send a binding update to the home agent 18 with a request to verify the home IP address as well as the identifier indicia for the mobile node 12 (step 208). The home agent 18 will verify that the home IP address is appropriate for the mobile node 12 associated with the identifier indicia provided in the binding update (step 210). Assuming the home IP address is properly verified, the home agent 18 will send a binding acknowledgement message indicating whether the home IP address was verified (step 212).

Based on the identifier indicia, the home agent 18 will provide name indicia for the mobile node 12 for the domain name server 30 (step 214) and then send a Domain Name Server (DNS) update to the domain name server 30 (step 216). The DNS update will include the home IP address and name indicia for the mobile node 12. The domain name server 30 will then update its registry (step 218). At this point, the correspondent node 28 can access the domain name server 30 using the appropriate name indicia for the mobile node 12 to obtain the most current home IP address for the mobile node 12 (steps 220 and 222).

From the above, the present invention allows for dynamic allocation of home IP addresses, and in certain embodiment supports this functionality by modifying the binding update and binding acknowledgement messages generally used in mobile Internet protocols, such as IPv6. In select embodiments, the initial binding update message is triggered when the mobile node 12 moves to a foreign network 20. The initial binding update messages are used to either request that a home IP address be allocated by the home agent 18 or request that a created home IP address be verified by the home agent 18. The term "allocation" is used to cover both of the embodiments described above, wherein the verification process is simply a step in the allocation technique provided by the present invention. Those skilled in the art will recognize that other messages may be used to obtain the functionality afforded by the present invention. As such, the appended claims are to be construed accordingly.

Figure 4:
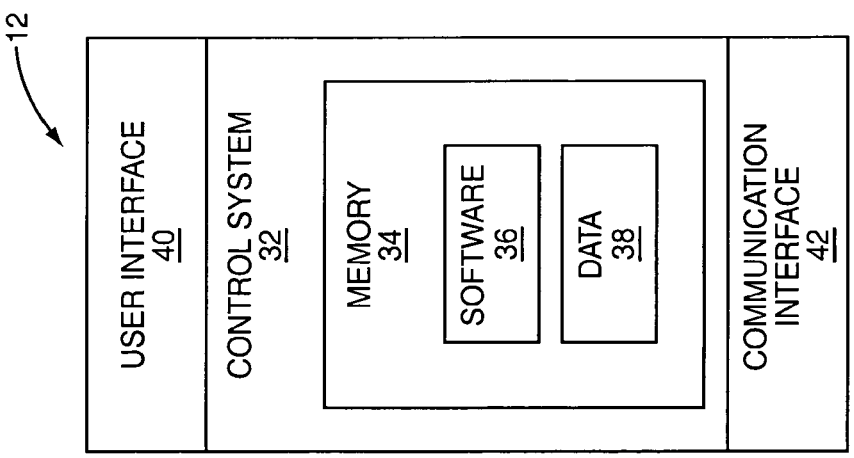
FIG. 4 is a block representation of a mobile node according to one embodiment of the present invention.

With reference to FIG. 4, a block representation of a mobile node 12 is illustrated. The mobile node 12 will generally include a control system 32 having memory 34 with the requisite software 36 and data 38 to operate as described above. The control system 32 will be associated with a user interface 40 to facilitate input and output functions associated with a user, as well as a communication interface 42 to facilitate communications with the home network 14 or the foreign networks 20 via appropriate access points 16, 24. The communication interface 22 will generally be a wireless communication interface supporting cellular or local wireless communication techniques such as those used in wireless local area networks. However, the communication interface 42 may support a physical wired connection with the access points 16, 24.

Figure 5:
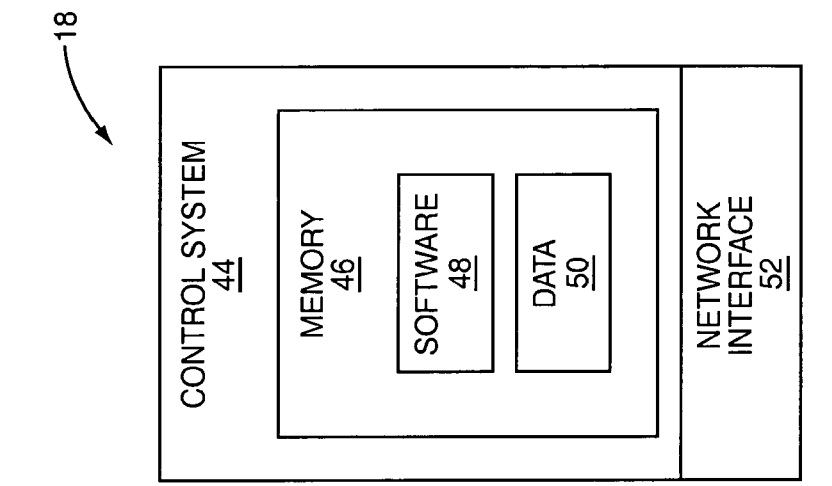
FIG. 5 is a block representation of a home agent according to one embodiment of the present invention.

FIG. 5 is a block representation of a home agent 18 according to one embodiment of the present invention. The home agent 18 may be implemented in any type of routing, switching, bridging, or serving node, and will include a control system 44 associated with memory 46 with the requisite software 48 and data 50 to operate as described above. The control system 44 will also be associated with a network interface 52 to facilitate communications via the home network 14.

Those skilled in the art will recognize improvements and modifications to the preferred embodiments of the present invention. All such improvements and modifications are considered within the scope of the concepts disclosed herein and the claims that follow.

What is claimed is:

1. A method for allocating an IP address to a mobile node, comprising:
   the mobile node sending a binding update message directly to a home agent, wherein the binding update message requests allocation of a home IP address for the mobile node, wherein said sending is performed while the mobile node roams on a foreign network from a home network of the mobile node; and the mobile node receiving the home IP address for the mobile node, wherein said receiving is performed in response to the home agent allocating the home IP address in response to the binding update message.

2. The method of claim 1, wherein the home IP address is received in a binding acknowledgement message.

3. The method of claim 1, wherein the binding update message further comprises an identifier identifying the mobile node.

4. The method of claim 1, further comprising:
the mobile node obtaining a care-of address for the mobile terminal;
wherein the binding update message comprises the care-of address.

5. The method of claim 4, wherein said obtaining the care-of address comprises requesting allocation of the care-of address from a foreign agent of the foreign network.

6. The method of claim 1, wherein the binding update message is the first binding update message sent by the mobile node upon moving to the foreign network.

7. The method of claim 1, wherein said sending is performed via the foreign network.

8. A non-transitory, computer accessible memory medium storing program instructions for allocating an IP address to a mobile node, wherein the program instructions are executable by one or more processors of the mobile node to:
send a binding update message directly to a home agent, wherein the binding update message requests allocation of a home IP address for the mobile node, wherein said sending is performed while the mobile node roams on a foreign network from a home network of the mobile node; and
receive the home IP address for the mobile node, wherein said receiving is performed in response to the home agent allocating the home IP address in response to the binding update message.

9. The non-transitory, computer accessible memory medium of claim 8, wherein the home IP address is received in a binding acknowledgement message.

10. The non-transitory, computer accessible memory medium of claim 8, wherein the binding update message further comprises an identifier identifying the mobile node.

11. The non-transitory, computer accessible memory medium of claim 8, wherein the program instructions are further executable to:
obtain a care-of address for the mobile terminal;
wherein the binding update message comprises the care-of address.

12. The non-transitory, computer accessible memory medium of claim 11, wherein said obtaining the care-of address comprises requesting allocation of the care-of address from a foreign agent of the foreign network.

13. The non-transitory, computer accessible memory medium of claim 8, wherein the binding update message is the first binding update message sent by the mobile node upon moving to the foreign network.

14. The non-transitory, computer accessible memory medium of claim 8, wherein said sending is performed via the foreign network.

15. A mobile node, comprising:
a wireless communication circuitry for performing wireless communication; and
control hardware coupled to the wireless transceiver, wherein the control hardware is configured to:
send a binding update message directly to a home agent via the wireless communication circuitry, wherein the binding update message requests allocation of a home IP address for the mobile node, wherein said sending is performed while the mobile node roams on a foreign network from a home network of the mobile node; and
receive the home IP address for the mobile node via the wireless communication circuitry, wherein said receiving is performed in response to the home agent allocating the home IP address in response to the binding update message.

16. The mobile node of claim 15, wherein the home IP address is received in a binding acknowledgement message.

17. The mobile node of claim 15, wherein the binding update message further comprises an identifier identifying the mobile node.

18. The mobile node of claim 15, wherein the control hardware is further configured to:
obtain a care-of address for the mobile terminal;
wherein the binding update message comprises the care-of address.

19. The mobile node of claim 15, wherein said obtaining the care-of address comprises requesting allocation of the care-of address from a foreign agent of the foreign network.

20. The mobile node of claim 15, wherein the binding update message is the first binding update message sent by the mobile node upon moving to the foreign network.

* * * * *